Patented May 29, 1951

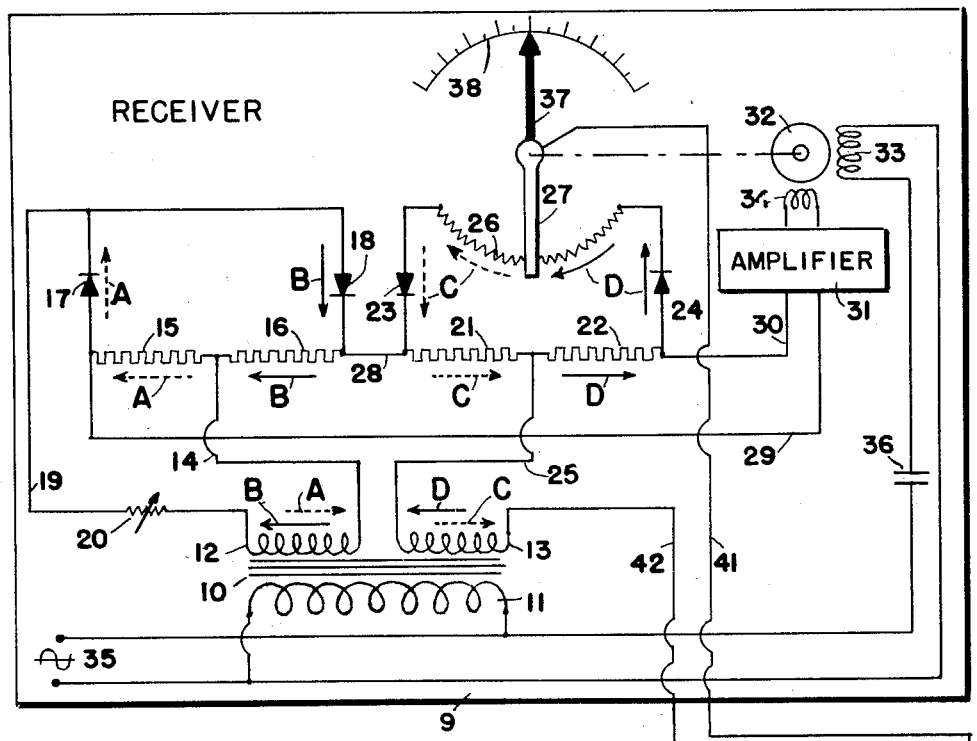
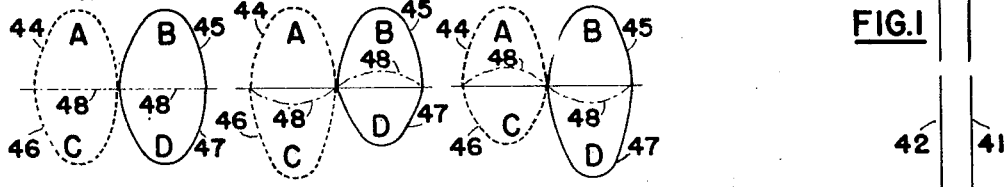
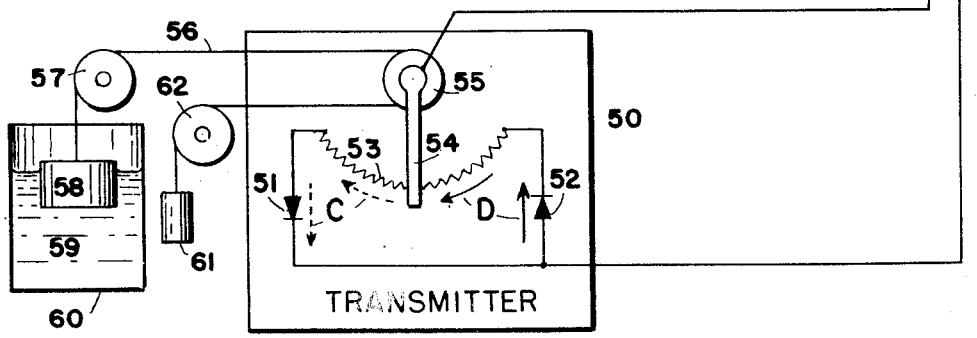

2,555,166

UNITED STATES PATENT OFFICE 2,555,166

MEASURING NETWORK UTILIZING RECTIFIED CURRENTS

Fritz Frederick Uehling, Passaic, N. J.

Application April 12, 1948, Serial No. 20,443

18 Claims. (Cl. 318—28)

This invention relates to improved means for measuring the magnitude of a condition, and more especially to a novel means and method for producing and regulating an alternating electromotive force, and to the utilization of such an electromotive force in the arts of electrical measurement, control and telemetering. Because of its peculiar adaptability to such arts, the principles of my invention will be set forth as incorporated in an electrical network and its components for developing and utilizing an alternating potential which in its value shall be representative of a magnitude to be measured and quantitatively reproduced at a remote point. Electrical telemetering systems are conveniently classified into several more or less distinct groups, one of which is known as the "position" type (ASA Std. C-42; Def. 30.40.170) and wherein a pointer, pen or other exhibiting member in the "receiving" instrument continually tends to assume a position in space corresponding to that of a pointer or deflecting member in a "transmitting" instrument. Because the operating principle of such a system generally involves the ratio, or some other relationship, existing between two or more electrical quantities, it follows that the circuit interconnecting the receiving and transmitting instrument must in general comprise three or more conductors, which seriously restricts the use of such systems in comparison with those in which the "signals" may be carried over a two-conductor circuit.

It is an object of this invention to provide means for obtaining a measurable alternating voltage, adjustable in value, and dependent in amplitude and phase position upon a magnitude to be measured or transmitted.

It is a further object of the invention to provide, for obtaining a voltage of the above nature, means in which adjustment of both amplitude and phase position of said voltage may be effected from a remote point and over a two-conductor circuit of indefinite length.

It is a further object to provide a telemetering system of the "position" class, which shall be operable over a simple two-conductor circuit, and in which the accuracy of measurement of the sensitivity of operation shall not be affected by wide variation in circuit characteristics or supply voltage.

It is a further object to provide a telemetering system of the above nature having a servo-actuated receiving instrument devoid of moving parts in its detector element, and which shall be self- restoring after interruption to the power supply or the interconnecting circuit.

It is a further object to provide a telemetering system of the above nature, which may be operated by power applied at only one of the interconnected stations.

In my previous Patent No. 2,232,288, granted February 18, 1941, I have shown a system in which, by the use of rectifying elements and suitable associated circuits, a symmetrical alternating current is caused to divide into two half-waves, whose relative magnitude is a function of a variable under measurement, resulting in a lack of symmetry, made manifest by a unidirectional component in the line current. By means of a circuit-balancing device subject to the deflections of a galvanometer sensitive only to this component, the line current is restored to a purely alternating characteristic, whereupon the extent of the balancing effort becomes a measure of the original magnitude.

In effecting the purposes of the present invention, it is proposed again to utilize the principle of the asymmetrical alternating current, but, without the interposition of a direct-current-sensitive detector, to apply the same directly in the actuation of an alternating-current servomotor for restoring the symmetry of the current.

In general, the method involves the opposing of pulsating voltages derived from two sources maintained in fixed phase-relation, as, for example, rectifiers energized from a common alternating-current supply, the half-waves comprising one of said voltages being maintained of equal amplitude, and those comprising the other subject to modification by means for varying the relative amplitudes of alternate half-waves, to produce a resultant alternating potential. The amplitude-varying means is embodied in a transmitting element electrically connected to a receiving element incorporating the two sources of rectified voltage; and amplitude-equalizing means actuated by an alternating-current motor responsive to said resultant potential, tends to restore the symmetry of the opposed voltages, thereby reducing said potential toward a zero value.

In the drawings:

Figure 1 is a diagrammatic representation in the form of a telemetering system embodying the principles of the invention.

Figures 2, 3, and 4 are representations of the wave-forms of interrelated currents or potentials existing in the system under certain conditions of operation.

The particular form of the invention, as illustrated in Figure 1, represents a telemetering system consisting of a receiving instrument 9, a transmitting instrument 50, and a suitable two-conductor interconnecting circuit. The receiving instrument includes a transformer 10 having a primary winding 11 and two similar secondary windings 12 and 13. The external circuit of the secondary winding 12 includes a conductor 14, connected to one terminal thereof, two equal resistors 15 and 16 in parallel, two similar but opposed rectifiers 17 and 18 in series with resistors 15 and 16 respectively, and having a common junction to a conductor 19 including an adjustable series resistor 20 and connected to the free terminal of the winding 12, thereby completing its external circuit. Because of the symmetry of the loop formed by the resistors 15 and 16 and the rectifiers 17 and 18, it will be seen that the output of the winding 12 will divide into half-waves of equal amplitude, whose respective polarities may be represented by the dotted, and the full-line, arrows A and B respectively. The rheostat 20 provides for variation of the output current from the winding 12, and thus for simultaneous adjustment of the amplitudes of the half-waves of current, as will hereinafter be more fully set forth.

The output circuit of the winding 13 includes a loop formed of two resistors 21 and 22, and two rectifiers 23 and 24, similar in proportions and arrangements of the corresponding element in the loop supplied from the winding 12. The junction point of the resistors 21 and 22 is connected to one end of the winding 13 by means of a conductor 25, and between the free ends of the rectifiers 23 and 24 is connected a slide-wire resistor 26 having a movable contact or slider 27, whereby the former may be divided into portions bearing a resistance relationship dependent upon the position of said slider.

The transmitting instrument 50 includes a loop comprising two rectifiers 51 and 52 and a slide-wire 53 having associated therewith a slider 54 whereby the slide-wire may be divided into portions bearing a resistance relationship dependent upon the position of the slider. The cathode of one of the rectifiers 51—52 is connected to the anode of the other, and the junction point by a conductor 41 to the slider 27 in the receiving instrument 9. The slider 54 is connected by a conductor 42 to the free terminal of the secondary winding 13 in the receiver, thus completing the output circuit of that winding.

With rectifier polarities selected and coordinated as indicated in Figure 1, it will be seen that the output of the winding 13 will divide about the loop formed by the resistors 21 and 22 and the rectifiers 23 and 24 in two portions corresponding in polarity to the two half-waves, as indicated by the dotted-line and full-line arrows C and D respectively, and will similarly divide about the loop formed by the rectifiers 51 and 52 and the two portions of the slide-wire 53 in the transmitting instrument 50.

The junction point between the resistor 16 and the rectifier 18 is connected by means of a conductor 28 to the junction point between the resistor 21 and the rectifier 23. The junction point between the resistor 15 and the rectifier 17 and the junction point between the resistor 22 and the rectifier 24 are connected by means of conductors 29 and 30 respectively to the input terminals of an amplifier 31, whereby the potential between said last-named two junction points, that is to say, the potential across the resistors 15, 16, 21 and 22 in series, may be suitably amplified.

Mechanically connected to the slider 27 for translating the same with respect to the slide-wire 26 is a reversible electric motor 32 preferably of the two-phase alternating-current class, having a winding 33 adapted to continuous energization from an alternating current source, and a winding 34 angularly displaced therefrom and adapted to be energized from the output terminals of the amplifier 31. The winding 33 of the motor 32 and the primary winding 11 of the transformer 10 are energized from a common alternating-current source 35, the interconnecting circuit including, if necessary, a capacitor 36, or equivalent phase-shifting means well known in the art, whereby to obtain optimum phase relation between the voltages impressed upon the respective windings of the motor 32. Attached to the slider 27, and movable therewith is an indicator or pointer 37, cooperating with a stationary graduated scale 38, whereby to provide a quantitative measure of the deflected position of said slider.

In the particular form of instrument illustrated in Figure 1, the transmitting instrument 50 takes the form of a water-level gauge, the slider 54 having operatively attached thereto a pulley 55 about which is wrapped a cable 56 passing over a sheave 57 to a float 58 movable with variations in level of a body of liquid 59 within a container 60. Tension is maintained on the cable 56 by means of a suitable counterweight 61 carried on the free end of said cable and hanging from the sheave 62. Thus, the position of the slider 54 with respect to the slide-wire 53 is a measure of the level of liquid in the container 60.

The nature of the currents flowing in various parts of the electrical circuit will be understood by reference to Figures 2, 3, and 4. In all three of these figures, the pulsating currents flowing in the resistors 15 and 16 (which currents remain unchanged) are represented by the half-waves 44 and 45, corresponding to the arrows A and B in Figure 1. With the sliders 27 and 54 in their mid-positions, as seen in Figure 1, the half-waves in the resistors 21 and 22 will also be of equal value, and, being in opposition to the currents 44 and 45 in the detector circuit containing the conductors 28, 29, 30, and the input terminals of the amplifier 31, may be represented by the half-waves 46 and 47 respectively. Now, if by adjustment of the rheostat 20, the potential drop across the resistors 15 and 16 be made equal to that across the resistors 21 and 22, the total potential in the detector circuit, being the resultant of equal half-waves at all times in phase-opposition, will maintain a zero value, as indicated at 48 in Figure 2.

While the magnitude of the pulsating voltage as represented by the drop across the resistors 15 and 16 is maintained constant at all times, the relative amplitude of the two half-waves representing the drop across the resistors 21 and 22 is subject to the position of either the slider 27 in the receiving instrument or the slider 54 in the transmitter. Assume, for example, that the slider 54 has been moved toward the left as seen in the drawing, along the slide-wire 53. The resultant decrease in resistance of the portion of the slide-wire in series with the rectifier 51, and the corresponding increase in the resistance of the path through the rectifier 52 will cause an increase in the value of the current flowing through the rectifiers 51 and 23, and a decrease in the value of that flowing through the rectifiers 52 and 24. The several currents existing in the network will then be as indicated in Figure 3. The half-waves 44 and 45 will remain unchanged, but the half-wave 46 representing the current in the rectifiers 51 and 23 will be of increased amplitude, while the half-wave 47, representing the current in the rectifiers 52 and 24 will be of decreased amplitude. Thus, the constant half-waves 44 and 45 will no longer be balanced by the opposed half-waves 46 and 47 respectively; and the resultant potential in the detector circuit including the four resistors 15, 16, 21 and 22, will be an alternating-current wave, as indicated by 48 in Figure 3.

In a similar manner, a displacement of the slider 54 in the transmitting instrument toward the right will disturb the symmetry of the network, causing the half-wave through the rectifier 51 to be decreased, and that through the rectifier 52 increased, as indicated by 46 and 47 respectively in Figure 4. The constant half-waves 44 and 45 being no longer balanced by the opposed half-waves 46 and 47, there will appear a resultant, as indicated by 48 in Figure 4, this being similar to, but of opposite polarity to, the corresponding wave previously considered in Figure 3.

Thus it will be seen, there has been provided means whereby there may be derived from a single basic source of alternating current an alternating voltage of the same frequency but controllable in amplitude and in phase position with respect to said source by adjustable means at the extremity of a two-conductor circuit of indefinite length. While for present purposes it has been found expedient to describe the source of the two opposed pulsating voltages as being a pair of similar rectifying elements energized from a common alternating-current source, it will be obvious that, without in any way effecting the spirit of this invention, equivalent results could be obtained with any two sources of pulsating voltage operable in synchronized opposition, one being subject to adjustment of the relative values of its half-waves independently of the other. For example, such a source would be found in a bipolar generator having two independent armature windings, or in two similar bipolar generators operated in synchronism, the armature in either instance being provided with a two-segment commutator to give a unidirectional, but pulsating, output potential. While direct measurement of the total alternating potential in the detector circuit including the four resistors 15, 16, 21, and 22, will provide a measure of the displacement of the slider 54, and consideration of the phase position of said potential with respect to that of the source will indicate the sense of said displacement from a neutral position, the obvious and practical manner of utilizing said potential lies in employing the balance or null principle as will now be set forth.

The voltage developed in the detector circuit including the resistors 15, 16, 21 and 22, applied to the input terminals of the amplifier 31 through the conductors 29 and 30, amplified, and impressed on the winding 34 of the motor 32, will react with the field produced by the current flowing in the winding 33 to operate said motor with a force, and in a direction, depending upon the amplitude and the phase position, respectively of the amplifier output, that is to say, with the degree of voltage unbalance in the detector circuit, and hence with the displacement of the sliding contact 54 along the slide-wire 53.

The connections of the motor 32 are made such in relation to one another and to the mechanical attachment of the motor to the slider 27 that, energization of the motor as above set forth, with an alternating potential as indicated by 48 in Figure 3, amplified and impressed upon the winding 34, the slider 27 will be moved along the slide-wire 26 toward the right as seen in the drawing, tending to increase the resistance of the current path through the rectifier 23 and decrease that through the rectifier 24. This action will tend to offset the effect of the displacement of the slider 54 in the transmitting instrument 50 and restore the half-waves 46 and 47 to equality, causing the resultant potential 48 to approach a zero value, until a balance is complete, and the motor 32 comes to rest. In a similar manner, if the winding 34 be energized by the amplified alternating potential as indicated by 48 in Figure 4, the motor will tend to operate in a sense to move the slider 27 toward the left along the slide-wire 26, and, by redistribution of resistance of portions thereof in series with the rectifiers 23 and 24 respectively will tend to restore symmetry to the rectified half-waves, and thereby reduce the voltage 48 to a zero value and re-established balanced conditions in the network.

Thus, it will be seen that for every position at which the slider 54 in the transmitting instrument may be set, the slider 27 in the receiving instrument will assume a corresponding and definite position. Since the former slider is subject to displacement by the float 58, and thereby assumes a position representative of the level of the liquid in the container 60, the pointer or index 37 by its position with respect to the scale 38 will provide in the receiving instrument a measure of the liquid level determined at the transmitter. Since balanced or unbalanced conditions are subject only to the symmetries of the loops associated with the respective slide-wires, and since operation of the balance motor depends only upon the phase position and amplitude of the departure of the voltage 48 from a zero value, it will be apparent that the accuracy of the system is independent of the voltage and the frequency of the supply, so long as these are not beyond the operating range of the motor. A change in the resistance of the interconnecting circuit comprising the conductors 41 and 42 will affect similarly both half-waves 46 and 47, with a tendency to introduce a double-frequency component in the amplifier input. Such a component, unless extreme, will have no objectionable effect upon the operation of the motor; and, should its elimination become desirable, complete compensation may be obtained by manipulation of the rheostat 20.

I claim:

1. The combination with two sources of full-wave rectified voltage, of a circuit in which the voltage from one of said sources normally balances that of the other, variable resistance means for changing the relative amplitude of the two half-waves from one of said sources to unbalance said voltages, and independent means for changing said relative amplitude to rebalance said voltages.

2. The combination with a source of rectified voltage having both half-waves of one polarity, of a second source of rectified voltage having both half-waves of the opposite polarity, a circuit which includes both sources, variable resistance means controlled by the magnitude of a condition for changing the relative amplitude of the two half-waves from one of said sources, and independent means controlled by said circuit for changing said relative amplitude.

3. The combination with a constant source of full-wave rectified voltage, of a second source of full-wave rectified voltage of the same magnitude, a circuit which includes both sources one of which opposes the other, and means for changing the relative amplitude of the two half-waves from one of said sources to create an alternating current voltage across both of said sources in series.

4. The combination with a constant source of full-wave rectified voltage, of a second source of full-wave rectified voltage of the same magnitude, means for opposing said voltages to create a balanced condition, means controlled by the magnitude of a condition for changing in one direction the relative amplitude of the two half-waves from the second source to create an alternating current voltage across said two sources in series, a second means for changing in the opposite direction the relative amplitude of the two half-waves from the second source, and means controlled by said alternating current voltage for actuating the second changing means.

5. The combination with a source of steady pulsating voltage, of a second source of pulsating voltage, means for opposing the voltages from said sources, means controlled by the magnitude of a variable for changing the relative amplitude of successive pulses from the second source in one sense, and means controlled by an unbalanced condition of the opposed pulsating voltages for changing, in the opposite sense, the relative amplitude of said successive pulses.

6. The combination with a source of pulsating voltage, of a second source of pulsating voltage, means for opposing one of said voltages to the other, means for changing in one sense or the other the relative amplitude of successive impulses from one of said sources to establish an unbalanced condition between said voltages, means controlled by a variable condition for actuating said changing means, independent means for changing said relative amplitude in the opposite sense, and means controlled by said unbalanced condition for actuating said independent changing means to reestablish a balanced condition between said voltages.

7. The combination with a source of full-wave rectified voltage, of a second source of full-wave rectified voltage, a circuit which includes both of said sources, the voltage of one of which opposes that of the other, means controlled by the magnitude of a condition for changing the relative magnitude of the two half-waves from one source to create an alternating current in the circuit, and means controlled by said alternating current for independently changing the relative magnitude of the two half-waves from said one source.

8. In a telemetering system, the combination with a transmitter consisting of a loop which includes two rectifiers and a slide-wire, a movable contact engaging said slide-wire, and means controlled by the magnitude of a condition for moving the contact, of a receiver consisting of a second loop which includes a third and fourth rectifier, two fixed resistances, and a second slide-wire, a second movable contact engaging the second slide-wire, a third loop which includes a fifth and sixth rectifier and a third and fourth fixed resistance, a circuit which includes the four fixed resistances, means controlled by the circuit for actuating the second movable contact, a source of alternating current connected between the contact of the transmitter and a point between the two fixed resistances of the second loop, an electrical connection between the contact of the receiver and a point between the two rectifiers of the first loop, and a second source of alternating current connected from a point between the two fixed resistances of the third loop to a point between the two rectifiers of said loop.

9. In a device of the class described, the combination with a circuit which includes two pairs of parallel branches, a rectifier in the first branch of one pair for passing current of one polarity, a rectifier in the second branch of said one pair for passing current of the opposite polarity, means for changing the relative resistance of the two branches of said one pair, means controlled by the magnitude of a condition for actuating the changing means, a resistance in the first branch of the other pair of branches including a rectifier for passing current of said one polarity, a second resistance in the second branch of said other pair including a rectifier for passing current of said opposite polarity, a second means for changing the relative resistance of the two branches of said other pair, and a source of alternating current for energizing the circuit, of a second circuit which includes two parallel branches, a third resistance in one of said branches including a rectifier for passing current of one polarity, a fourth resistance in the other of said branches including a rectifier for passing current of the opposite polarity, a second source of alternating current for energizing the second circuit, a third circuit which includes the four resistances, and means controlled by the third circuit for actuating the second changing means.

10. In a device of the class described, the combination with a circuit which includes two sources of rectified voltage, one of which opposes the other, of a source of alternating current for energizing the first of said rectified voltage sources, a second source of alternating current for energizing the second of said rectified voltage sources, means for changing the relative amplitude of the two half-waves from the second alternating current source, means controlled by the magnitude of a condition for actuating the changing means, a second means for changing said relative amplitude and means controlled by the circuit for actuating the second changing means.

11. The combination with four fixed resistances in series, of two sources of alternating current, a circuit which includes the first source, the first of said resistances and a rectifier for passing current from the source in one direction, a second circuit which includes the first source, the second resistance and a second rectifier for passing current from the source in the opposite direction, a third circuit which includes the second source, the third of said resistances and a third rectifier for passing current from the second source in one direction, a fourth circuit which includes the second source, the fourth resistance and a fourth rectifier for passing current from the second source in the opposite direction, means for changing the relative resistance of the third and fourth circuits, a fifth circuit which includes the four fixed resistances in series, and means controlled by the fifth circuit for actuating the changing means.

12. The means set forth in claim 11 with the addition of independent means controlled by the magnitude of a condition for changing the relative resistance of the third and fourth circuits.

13. The combination with a source of full-wave rectified voltage, of a second source of full-wave rectified voltage which normally balances the voltage from the first source, means controlled by changes in the magnitude of a condition for changing, in one sense, the relative amplitude of the two half-waves from the second source to disturb the balance between said sources, and means controlled by said disturbance for changing, in the opposite sense, the relative amplitude of the two half-waves from said second source to reestablish said balance.

14. The combination with four resistances in series, of means for alternately passing current of one polarity through the first and second resistances, means for alternately passing current of the opposite polarity through the third and fourth resistances, means responsive to changes in a condition for changing the relative magnitude of the current through the third resistance and the current through the fourth resistance, and independent means controlled by the total drop in potential across the first, second, third and fourth resistances for balancing said magnitudes.

15. The combination with a circuit energized by a source of alternating current, of a full-wave rectifier in the circuit to provide a source of rectified voltage, a second circuit energized by a second source of alternating current, a second full-wave rectifier in the second circuit to provide a second source of rectified voltage, a third circuit in which the two sources of rectified voltage oppose each other, means for changing the relative amplitude of the two half-waves of opposite polarity from the second source of alternating current, means controlled by changes in the magnitude of a condition for actuating the changing means, a second means for changing the relative amplitude of the two half-waves from the second source of alternating current, and means controlled by the third circuit for actuating the second changing means.

16. The combination with four fixed resistances in series, of a source of alternating current having two half-waves of opposite polarity, a circuit which includes the source, the first resistance and a rectifier for conducting the half-waves of one polarity, a second circuit which includes the source, the second resistance and a second rectifier for conducting the half-waves of opposite polarity, a second source of alternating current having two half-waves of opposite polarity, a third circuit which includes the second source, the third resistance, a third rectifier for conducting the half-waves of said one polarity, and a fourth rectifier for conducting the half-waves of said one polarity, a fourth circuit which includes the second source, the fourth resistance, a fifth rectifier for conducting the half-waves of opposite polarity and a sixth rectifier for conducting said half-waves of said opposite polarity, means for changing the relative magnitude of the total resistance of the third circuit with respect to the total resistance of the fourth circuit, means controlled by the magnitude of a condition for actuating said changing means, a second means for changing said relative magnitude, a fifth circuit which includes the first, second, third and fourth resistances in series, and means controlled by the fifth circuit for actuating the second changing means.

17. In a telemetering system, the combination with a transmitter comprising a loop including two sources of pulsating voltage and a slide-wire, a movable contact engaging the slide-wire, and means controlled by the magnitude of a condition for moving the contact, of a receiver comprising a second loop including a third and a fourth source of pulsating voltage, two fixed resistors, a second slide-wire and a second movable contact engaging the same, a third loop comprising a fifth and a sixth source of pulsating voltage and a third and a fourth fixed resistor, a circuit including the four fixed resistors, means controlled by said circuit for actuating the contact of said second slide-wire, a source of alternating current connected between the slide-wire contact of the transmitter and a point between the fixed resistors of the second loop, a conductor connected from the slide-wire contact of the receiver to a point between the voltage sources of the first named loop, and a second source of alternating current connected from a point between the two fixed resistors of the third loop and a point between the voltage sources of said loop.

18. In a telemetering system, the combination with a receiving instrument including two sources of pulsating voltage of the same frequency connected in opposition to produce a resultant voltage representing the algebraic sum of the voltages derived from said two sources, means for varying in opposite senses the amplitudes of successive half-waves of one of said pulsating voltages, means responsive to said resultant voltage to affect said varying means in a sense to maintain equality between the amplitudes of successive half-waves, of a transmitting instrument embodying a divided circuit having two branches including a rectifier element in each branch and movably adjustable resistance means in at least one of said branches, means responsive to a measured magnitude for adjusting said resistance means, a two-conductor circuit connecting said divided circuit in said transmitter with said amplitude-varying means in said receiver to render the effect of said resultant voltage responsive means subject to modification by adjustment of said resistance means.

FRITZ FREDERICK UEHLING.

REFERENCES CITED

The following references are of record in the file of this patent:

UNITED STATES PATENTS

| Number | Name | Date |
| --- | --- | --- |
| 2,379,689 | Crosby | July 3, 1945 |
| 2,388,769 | Shaffer | Nov. 13, 1945 |
| 2,414,317 | Middel | Jan. 14, 1947 |
| 2,446,188 | Miller | Aug. 3, 1948 |
| 2,447,232 | Cartotto | Aug. 17, 1948 |
| 2,447,321 | Ertzmann | Aug. 17, 1948 |